US009154821B2

(12) United States Patent
Davies

(10) Patent No.: US 9,154,821 B2
(45) Date of Patent: Oct. 6, 2015

(54) SYSTEMS AND METHODS FOR DISPLAYING VIEWERSHIP AND/OR MESSAGE DATA

(75) Inventor: Benedict John Davies, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/288,837

(22) Filed: Nov. 3, 2011

(65) Prior Publication Data

US 2013/0117773 A1    May 9, 2013

(51) Int. Cl.
H04N 7/10 (2006.01)
H04N 7/025 (2006.01)
H04N 21/25 (2011.01)
H04N 21/442 (2011.01)
H04N 21/4788 (2011.01)
H04N 21/488 (2011.01)
H04N 21/63 (2011.01)
H04N 21/466 (2011.01)
H04N 21/482 (2011.01)

(52) U.S. Cl.
CPC ....... H04N 21/252 (2013.01); H04N 21/44204 (2013.01); H04N 21/44222 (2013.01); H04N 21/4667 (2013.01); H04N 21/4788 (2013.01); H04N 21/482 (2013.01); H04N 21/4826 (2013.01); H04N 21/4882 (2013.01); H04N 21/632 (2013.01)

(58) Field of Classification Search
CPC ............ H04N 21/252; H04N 21/4422; H04N 21/4788; H04N 21/4882; H04N 21/632; H04N 21/44204; H04N 21/4667; H04N 21/482; H04N 21/4826
USPC .............................. 725/34–36, 40, 43–46, 50
See application file for complete search history.

(56) References Cited

U.S. PATENT DOCUMENTS

| 6,177,931 | B1* | 1/2001 | Alexander et al. ............... 725/52 |
| 7,707,246 | B1 | 4/2010 | Issa et al. |
| 7,895,625 | B1 | 2/2011 | Bryan et al. |
| 8,402,506 | B2* | 3/2013 | Mills et al. ..................... 725/153 |
| 2002/0112239 | A1* | 8/2002 | Goldman ......................... 725/46 |
| 2003/0237095 | A1* | 12/2003 | Srinivas .......................... 725/46 |
| 2004/0107439 | A1 | 6/2004 | Hassell et al. |

(Continued)

FOREIGN PATENT DOCUMENTS

| JP | 2010-135925 | 6/2010 |
| KR | 10-2008-0046462 | 5/2008 |
| WO | WO-2010/100832 | 9/2010 |

OTHER PUBLICATIONS

International Search Report and Written Opinion for PCT/US2012/061558, mailing date Oct. 24, 2012, 13 pages.

(Continued)

Primary Examiner — Jason Salce
(74) Attorney, Agent, or Firm — Byrne Poh LLP

(57) ABSTRACT

Methods and systems for enhancing program-viewing experience with viewership, message, and supplemental data include receiving a program identifier for a media program to be viewed; receiving one or more of viewership, message, and/or supplemental data relating to the media program; compiling the viewership, message, and/or supplemental data with the program identifier; storing the viewership, message, and/or supplemental data in a memory in association with the program identifier; and providing display data representing the viewership, message, and/or supplemental data and the program identifier.

18 Claims, 4 Drawing Sheets

(56) References Cited

U.S. PATENT DOCUMENTS

| | | | |
|---|---|---|---|
| 2008/0072247 A1* | 3/2008 | Barnard | 725/32 |
| 2008/0271080 A1* | 10/2008 | Gossweiler et al. | 725/47 |
| 2009/0100456 A1 | 4/2009 | Hughes | |
| 2009/0144768 A1 | 6/2009 | Nagaraja | |
| 2011/0145880 A1 | 6/2011 | Wang | |
| 2011/0208749 A1* | 8/2011 | Guo et al. | 707/748 |
| 2012/0110621 A1* | 5/2012 | Gossweiler, III | 725/46 |
| 2012/0117581 A1* | 5/2012 | Curtis et al. | 725/9 |
| 2012/0174157 A1* | 7/2012 | Stinson et al. | 725/40 |
| 2012/0297429 A1* | 11/2012 | Reed et al. | 725/86 |

OTHER PUBLICATIONS

International Preliminary Report on Patentability dated May 15, 2014 in International Patent Application No. PCT/US2012/061558.
International Search Report and Written Opinion of the International Search Authority dated Feb. 21, 2013 in International Patent Application No. PCT/US2012/061558.

* cited by examiner

SYSTEMS AND METHODS FOR DISPLAYING VIEWERSHIP AND/OR MESSAGE DATA

BACKGROUND

The present disclosure relates generally to the field of electronic program guides (EPG), and more particularly, to enhancing a program-viewing experience with supplemental data, such as viewership and message data.

In one example, an EPG may be used to determine what programs are available. The EPG may provide real-time viewership, message, or supplemental data related to the program.

SUMMARY

Implementations of the systems and methods for enhancing a program-viewing experience with viewership, message and supplemental data are described herein. One implementation is a system including memory hardware storing program instructions. The system may further include one or more processors in data communication with the memory hardware that are configured to execute the program instructions. Upon execution of the program instructions, the one or more processors perform operations including receiving a program identifier for a media program to be viewed; receiving one or more of viewership data relating to a plurality of viewers of the media program and message data relating to a quantity of electronic messages relating to the media program being generated by the plurality of viewers of the media program; compiling the viewership and/or message data with the program identifier using the one or more processors; storing the viewership and/or message data in a memory in association with the program identifier; and providing display data representing the viewership and/or message data and the program identifier.

Another implementation is a method that includes receiving a program identifier for a media program to be viewed. The method also includes receiving one or more of viewership data relating to a plurality of viewers of the media program and message data relating to a quantity of electronic messages relating to the media program being generated by the plurality of viewers of the media program. The method further includes compiling the viewership and/or message data with the program identifier. The method includes storing the viewership and/or message data in a memory in association with the program identifier. The method also includes providing display data representing the viewership and/or message data and the program identifier.

A further implementation is a method that includes receiving, at a processing circuit, a program identifier for a media program to be viewed. The method also includes receiving from a source other than a source of the media program, at the processing circuit, one or more of supplemental data relating to a quantity of electronic information relating to the media program being generated by one or more users. The method further includes compiling the supplemental data with the program identifier at the processing circuit. The method includes storing the supplemental data in a memory in association with the program identifier. The method also includes providing display data representing the supplemental data and the program identifier.

These implementations are mentioned not to limit or define the scope of the disclosure, but to provide an example of an implementation of the disclosure to aid in understanding thereof. Particular implementations can be developed to realize one or more of the following advantages.

The details of one or more implementations of the disclosure are set forth in the accompanying drawings and the description below. Other features, aspects, and advantages of the disclosure will become apparent from the description, the drawings, and the claims.

BRIEF DESCRIPTION OF THE DRAWINGS

The details of one or more implementations are set forth in the accompanying drawings and the description below. Other features, aspects, and advantages will become apparent from the description, the drawings, and the claims.

DETAILED DESCRIPTION

According to some implementations, a more extensive electronic program guide (EPG) may be provided to enhance a viewing experience by including viewership, message, or supplemental data. According to some implementations, the EPG may provide real-time viewership, message, or supplemental data.

Figure 1:
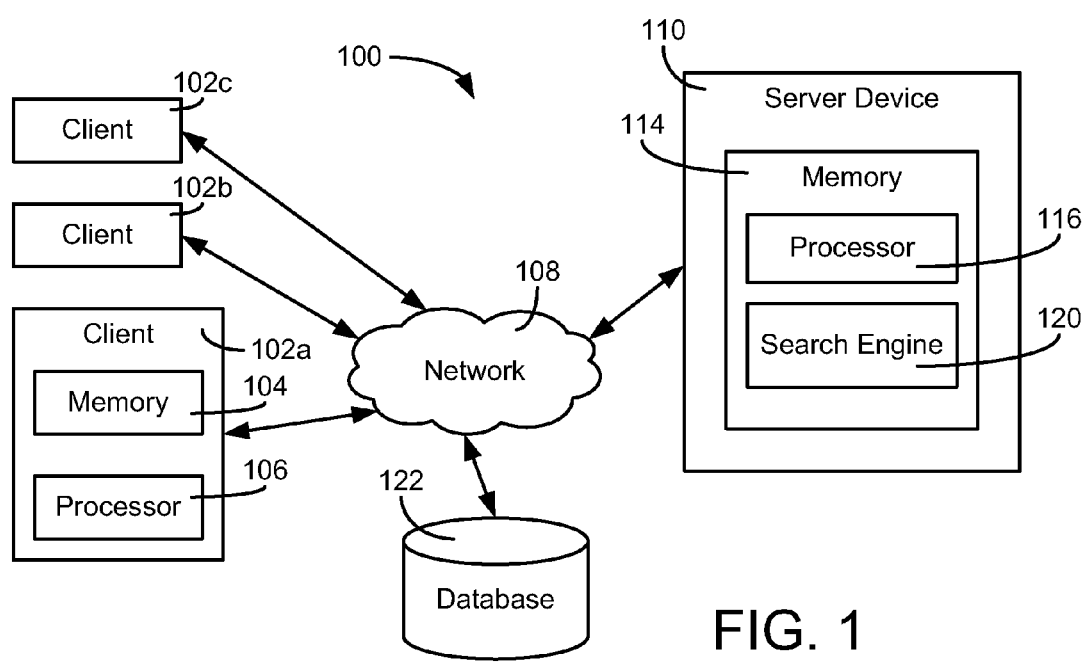
FIG. 1 is a block diagram of a system in accordance with a described implementation.

Referring to FIG. 1, a block diagram of a system in accordance with a described implementation is shown. The system 100 shown in FIG. 1 includes multiple clients 102a-102c in communication with the server 110 over a network 108. In some implementations, there are multiple servers that perform the functions of the single server in FIG. 1. The network shown includes the Internet. In other implementations, other networks, such as a wide area network (WAN), local area network (LAN), or intranet may be used. In some implementations, the systems and methods may operate within a single server. In a brief overview, the clients 102a-c and the server 110 may be remote from each other. The relationship of the clients 102a-c and server 110 arise by virtue of programs running on the respective device and having a client-server relationship to each other. In some implementations, the server 110 provides data (e.g., viewership data) to the clients 102a-c (e.g., for purposes of displaying data to and receiving user input from a user interacting with the client). Data generated at the clients 102a-c (e.g., a result of the user interaction) can be received from the client 102a-c at the server 110.

The clients 102a-102c each include one or more processing circuits 106 and a memory 104. The processing circuits 106 execute program instructions stored in memory 104. The processors 106 may include a microprocessor, application specific integrated circuit (ASIC) field programmable gate array (FPGA), state machines, etc. The memory 104 may include, but is not limited to, electronic, optical, magnetic, or any other storage or transmission device capable of providing a processor with program instructions. The memory 104 may further include a floppy disk, CD-ROM, DVD, magnetic disk, memory chip, ASIC, FPGA, ROM, RAM, EEPROM, EPROM, flash memory, optical media, or any other suitable memory from which a processor can read instructions. The instructions may include code from any suitable computer-programming language, such as, but not limited to, C, C++, C#, Go, Java, JavaScript, Perl, Python and Visual Basic.

Clients 102*a*-102*c* may also have a number of external or internal devices such as a mouse, a CD-ROM, DVD, a keyboard, a display, or other input or output devices. Examples of clients 102*a*-102*c* are personal computers, digital assistants, personal digital assistants, cellular phones, mobile phones, smart phones, pagers, digital tablets, laptop computers, Internet appliances, and other processor-based devices. In general, a client 102*a*-102*c* may be any type of processor-based platform that is connected to a network 108 and that interacts with one or more applications. Clients 102*a*-102*c* may operate on any operating system capable of supporting a browser or browser-enabled application, such as Linux, Mac OS, Windows etc. The clients 102*a*-102*c* shown include, for example, personal computers executing a browser application program such as Apple Computer, Inc.'s Safari, Microsoft Corporation's Internet Explorer, Mozilla's Firefox, and Netscape Communication Corporation's Netscape Navigator.

As shown in FIG. 1, the server 110 is also coupled to the network 108. The server 110 may include a processor 116 and memory 114 executing a search engine 120 application program. The server 110 may also include a media engine application program (not shown). Similar to the clients 102*a-c*, the server 110 shown in FIG. 1 includes a processor 116 having a memory. The memory 114 may store program instructions and the one or more processors in data communication with the processor 116 and configured to execute the program instructions, cause the one or more processors to perform operations. The server 110 may be implemented as a network of computer processors. In some implementations, the server 110 may be multiple servers, mainframe computers, networked computers, a processor-based device, and similar types of systems and devices.

The server 110 may include a search engine application program ("search engine"). In some implementations, the server 110 can include a related information server, advertising server, etc. The server 110 can access the network 108 to receive a program identifier for a media program to be viewed from other devices (e.g., clients, servers, etc.) or systems connected to the network 108.

Memory 114 may include the search engine 120. The search engine 120 may locate relevant information from the network 108 in response to a search query from a user. The query may contain identifiers of a media program to be viewed. The program identifier may identify the name of a television program, video, movie, etc. The program identifier may be any type of data and/or information associated with, embedded with, inferable from and/or injected into a program, and which may be used to identify that program. In some implementations, the program identifier is used to identify a portion of the program. The system may recognize the query as a media program and present a media program to a user based on the program identifier. The search engine 120 may also maintain a search log of the search queries. The search engine 120 may also use the program identifier to provide a set of search results to a user via the network 108. In some implementations, the search engine 120 locates relevant information from the network 108 in response to a selection from a user. The relevant information may contain identifiers of a media program to be viewed. The search engine 120 may also maintain a log of the user's selections.

In some implementations, users opt in to sharing their viewing data and allow for creations of customized EPGs. In some implementations, the server 110 receives the program identifier for a media program to be viewed. In some implementations, the server 110 is configured to receive one or more of viewership data relating to a plurality of viewers of the media program and/or messaging about the media program. Where practical, such data can be anonymized prior to be being sent to the server 110, either prior to or post-aggregation. In some implementations, the server 110 may be configured to receive one or more of message data relating to a quantity of electronic messages relating to the media program being generated by the plurality of viewers of the media program.

In some implementations, the server 110 is configured to receive one or more of supplemental data relating to a quantity of electronic information relating to the media program being generated by the plurality of viewers of the media program. Server 110 may be configured to receive a count of or actual messages to be counted from various message sources, such as a blog, a wiki page, a reference page, a social network such as Twitter, Facebook or Google+, or other sources. The server 110 may receive the viewership data and message data from the search engine, another server (e.g., a media server), another device (e.g., client) connected to the network, etc. In some implementations, the viewership data and message data may be received from a satellite broadcast, cable television broadcast, the Internet, terrestrial broadcast, etc.

Memory 114 may also contain a processor 116. The processor 116 may include compiling logic. The processor 116 may compile, correlate, collect, or otherwise store in association the supplemental data along with the program identifier such as, viewership data, message data, websites, blog posts, news articles, etc. In some implementations, the processor 116 is programmed or otherwise configured to compile the supplemental data along with the program identifier. Although the processor is shown as a single processor in FIG. 1, it is understood that more than one processor may be implemented within the system.

The viewership and/or message data may be stored in memory 114 along with the program identifier. In some implementations, the viewership and/or message data are collected over a period of time to generate trending data over the period of time. In some implementations, the server 110 is configured to provide display data representing the viewership and/or message data and the program identifier.

The supplemental data may be stored in memory 114 along with the program identifier. In some implementations, the supplemental data is collected over a period of time to generate trending data over the period of time. In some implementations, the collected supplemental data includes collecting usage information of the supplemental data. In some implementations, the usage information includes frequency of visits, number of visitors, and demographics of users related to the supplemental data. For example, the usage information may include the frequency of visits to a website, to an advertisement, to a social networking site, etc.

In some implementations, the server 110 is configured to provide display data representing the supplemental data and the program identifier. The server 110 may be configured to provide the trending data along with the display data and the program identifier. In some implementations, the display data is provided to other devices or systems connected to the network 108. In some implementations, the display data is received by a server 110. In some implementations, the display data may be received by another device, another server, etc.

Figure 2:
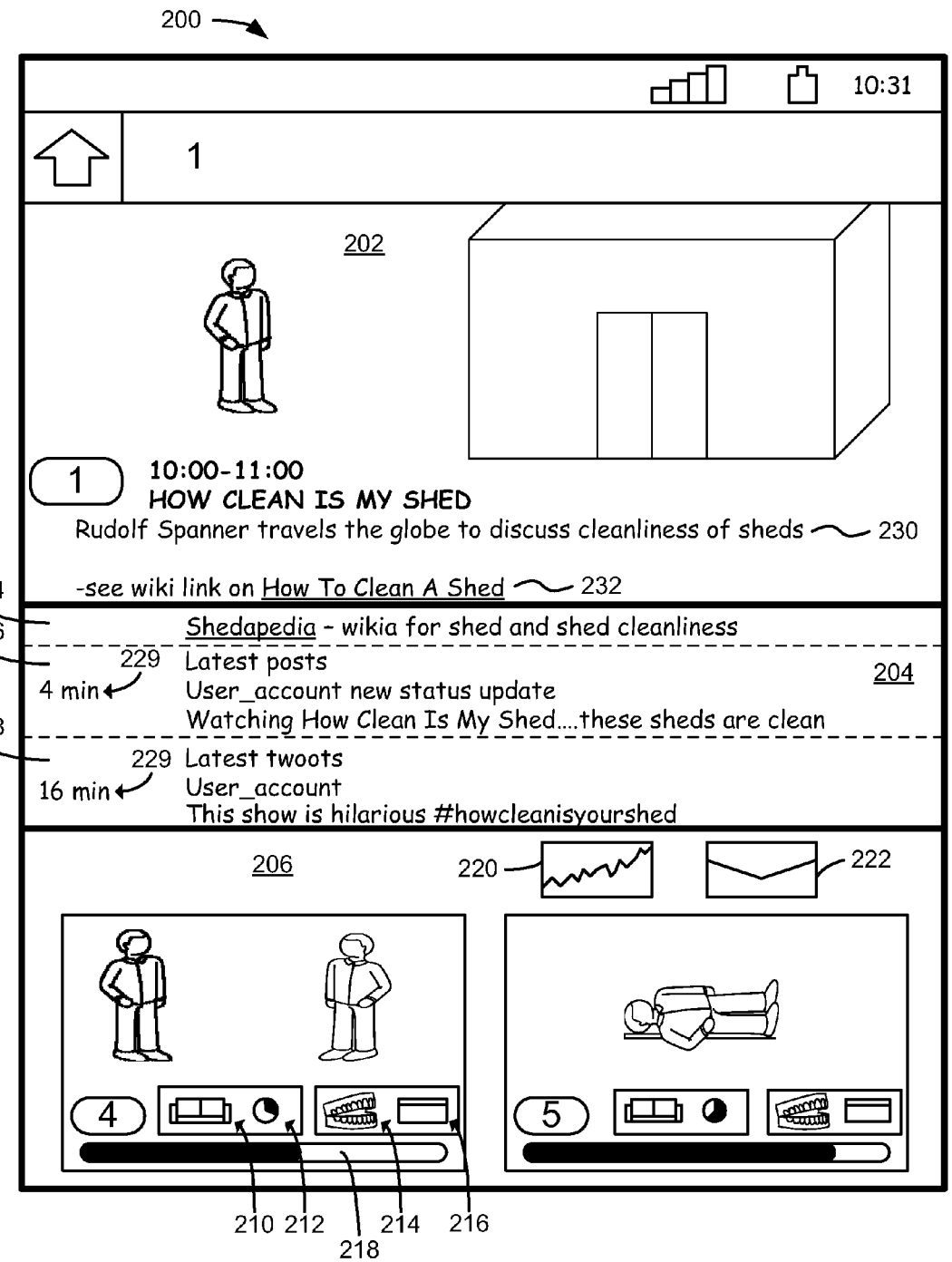
FIG. 2 illustrates a display providing viewership, message and supplemental data in accordance with a described implementation.

Referring to FIG. 2, a display 200 providing viewership, message and supplemental data in accordance with a described implementation is shown. In a brief overview, the display 200 of a media program includes viewership data, message data, and supplemental data in the display portions 202, 204, 206 of the display 202. While the implementation of FIG. 2 shows three display portions, it should be understood that the number of display portions may vary. Further, while the implementation of FIG. 2 shows viewership data, message data, and supplemental data in various portions of the display 200, it should be understood that the display of the viewership data, message data, and supplemental data may be varied from what is shown. Top portion 202 may be generally configured to display a current program along with supplemental data for the program, such as start time, end time, program title, a short textual summary of the program, a link to a wiki page about the program, and/or other supplemental data. Center portion 204 may be generally configured to display message data relating to the current program. Bottom portion 206 may be generally configured to display viewership data and message data accessible by selecting icons or symbols. Bottom portion 206 may further be configured to show other programs on other channels and corresponding information for the additional programs.

In some implementations, the display 200 shows viewership data. In some implementations, the display 200 shows message data. In some implementations, the display 200 shows supplemental data. In some implementations, various combinations of viewership, message and supplemental data are displayed. In some implementations, the user selects which form of data to display. The selections may be stored or saved, i.e., as user preferences.

FIG. 2 shows viewership data at the bottom portion 206 of the display 200, message data in the center portion 204 of the display 200, and supplemental data, display data and a TV program at the top portion 202 of the display 200. It should be understood that the viewership, message, and supplemental data may be displayed in various positions (as described below).

In some implementations, the viewership data is a percentage of all viewers of a program, or a percentage of a community which is or has been viewing the program. The community may be any group for purposes of viewing a program, e.g., acquaintances, family, friends, followers, network, connections, co-workers, etc. The community may be a social media group. For example, the viewership data may be the percentage of viewers from one or more circles in Google+.

In some implementations, the viewership data are various attributes or demographics (gender, age, income level, region, etc.) of a viewer or viewers. In some implementations, the viewership data is the total number of viewers. In some implementations, the viewership data is the number of viewers at certain time intervals, key moments, etc. For example, the viewership data may be determined in the first 10 minutes of a program, final 10 minutes of the program, intermission of a program, just prior to the start of a program, etc. In some implementations, the viewership data is shown in real-time, for example shortly after the viewership data is available or received by the server. In some implementations, the viewership data (percentage, total, time, etc.) is displayed from a community that is defined or selected by the user, program, etc.

In some implementations, the message data is the volume of commentary related to the program. In some implementations, the volume of commentary is the total message data that is being generated related to the program. In some implementations, the message data is the rate of commentary related to the program. For example, how many messages are being generated per unit of time. In some implementations, the message data is the number of messages at certain time intervals, key moments, etc. For example, the message data may be determined in the first 10 minutes of a program, final 10 minutes of the program, intermission of a program, etc. In some implementations, the message data is shown in real-time. In some implementations, the message data (total, time, etc.) is displayed from a community that is defined or selected by the user, program, etc.

In some implementations, the generation of message data includes message data not generated by current viewers of the program. The generation of message data may include message data from other "persons." "Persons" can be any user that is connected to the network that provides electronic messages relating to the media program.

In some implementations, the system determines a message is related to the program by mining content terms from the message. For example, the system may extract content terms from a newsfeed on Twitter to determine the message is related to a program.

In some implementations, visual feedback, for example, image(s), light(s), symbol(s), word(s), icon(s), etc. and/or auditory feedback, for example, buzzer(s), alarm(s), etc. may be used to provide display data representing viewership data and/or message data. For example, in FIG. 2, a pie chart 212 is displayed that represents the viewership data. As another example, in FIG. 2, a pair of teeth 214 may be displayed to represent the message data. As a further example, in FIG. 2, a sofa 210 may be displayed that represents viewership data (e.g., the number of people or friends watching a program) and a message box 216 may be displayed to represent the message data (e.g., a number of comments posted about the program). Other icons can alternatively be chosen for each category of viewership data. In some implementations, the message data may be displayed as a news feed (e.g., the news feed entries 226, 228) in the center portion 204 of the display 200. In other implementations, the news feed may be placed or situated anywhere on the display 200. In some implementations, the display of the message data in the news feed may have a time stamp 229. For example, FIG. 2 shows the most recent message data regarding the program, with time stamps indicating the data was "posted" 4 minutes or 16 minutes ago.

In some implementations, the display 200 is personalized for the viewer's experience. For example, the viewer may choose for the display 200 to display the percentage of viewers from social media circles, the number of men watching the program, etc. In some implementations, the viewer moves, hides, rotates, closes, exits, etc. the display data. In some implementations, the viewer emails, uploads, links, stores, shares, saves, sends, texts (e.g., MMS, SMS), etc. the display data.

In some implementations, the supplemental data is the volume of supplemental data related to the program. The volume of commentary may be the amount of supplemental data that is being generated relating to the program. In some implementations, the volume is the total amount of supplemental data that is being generated related to the program. In some implementations, the supplemental data is the rate of supplemental data related to the program. For example, such supplemental data may include how many blog posts are being generated per unit of time. In some implementations, the supplemental data may be the amount of supplemental data generated at certain time intervals, key moments, etc. For example, the generation of supplemental data may be determined in the first 10 minutes of a program, final 10 minutes of the program, intermission of a program, etc. In some implementations, the supplemental data is shown in real-time, e.g., uploaded blog posts, etc. In some implementations, the supplemental data is displayed from a community that is defined or selected by the user, program, etc.

In some implementations, visual feedback, for example, images, lights, symbol, word, icon, etc. or auditory feedback, for example, buzzer, alarm, etc. may be used to provide display data representing supplemental data. For example, in the top portion 202 of the display 200 of FIG. 2, a description 230 of the current program and a link 232 to more information on the program (e.g., a link to a website for "How To Clean A Shed") may be displayed. In some implementations, reference material is shared. For example, in the center portion 204 of the display 200, a program-related encyclopedia, Shedpedia, a fan-based wikia, may be shown at entry 224. If the link or the reference material is used, then the usage information may be tracked, logged, and stored by the system. The system may determine frequency of visits, number of visitors and demographics of visitors from the embedded links and/or reference material related to the supplemental data. The system may provide the usage information to the display or to other devices connected to the network.

In some implementations, the supplemental data is displayed as a news feed (e.g., as a news feed entry 224). The news feed may be placed or situated anywhere on the display. In some implementations, the viewer may move, hide, rotate, close, exit, etc. the supplemental data from the display. In some implementations, the viewer emails, uploads, links, stores, saves, shares, sends, texts (e.g., MMS, SMS), etc. the supplemental data.

In some implementations, trending data related to the viewership, message or supplemental data is displayed in various formats, including, but not limited to, visual, audio, textual, etc. For example, in FIG. 2, the trending data is shown as a chart icon 220. In some implementations, the display 200 includes a link for the viewer to follow for additional information relating to the viewership, message or supplemental data. In some implementations, the trending data is truncated into a "hot or not" program. For example, in FIG. 2, the sofa icon 210 may be red if the volume or rate of message data relating to the program is above a certain threshold, i.e., "hot". The threshold may be determined by Nielsen ratings, the community, user, etc.

In some implementations, the display 200 includes an overlay. The overlay may be closed, moved, rotated, tilted, etc. by the user. In some implementations, the overlay includes additional buttons related to a program viewing-experience including, but not limited to, viewership, message, and supplemental data. In some implementations, the buttons, icons, etc. are located on the overlay.

In some implementations, the display 200 includes the name of the channel, the name of the program or the remaining time of the program as shown in FIG. 2. In some implementations, the name of the actors is displayed next to the respective actor. For example, the actor's name may appear next to their face when the program is initially viewed. The display 200 may further include a message icon 222 that, upon selection, allows a user to leave a message relating to a program currently being viewed. The display 200 may further include a bar 218 representative of the number of viewers watching a program or channel.

Figure 3:
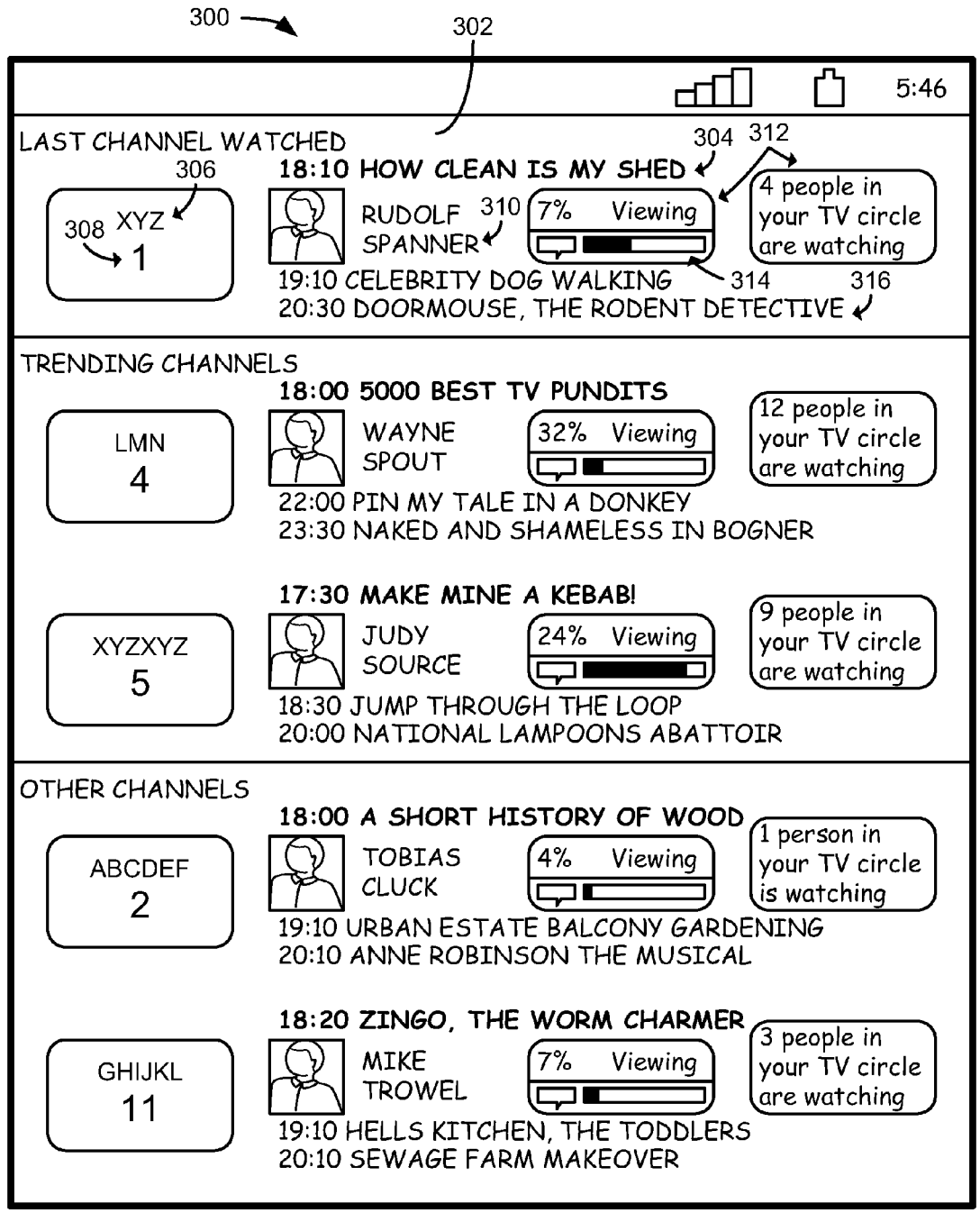
FIG. 3 illustrates a display in accordance with a described implementation.

Referring to FIG. 3, a display 300 in accordance with a described implementation is shown. In a brief overview, the display 300 includes electronic program guide data 302. For example, the electronic program guide data 302 in FIG. 3 includes one or more of the name 304 of the program, the name 306 of the channel, the number 308 of the channel, the actors 310 in the program, the viewership data 312, the message data 314, and the names of upcoming programs 316. The display 300 is shown displaying electronic program guide data for a channel being watched, trending channels (e.g., channels being watched by other users), and other channels. According to various implementations, the display 300 may be configured to display electronic program guide data for any number of channels. The selection of channels to display may be varied as described below.

In some implementations, the name 304 of the current program is displayed. In some implementations, the names of the upcoming programs 316 along with their scheduled times may be displayed. The names of the upcoming programs 316 may be related to the viewership data, the message data, or the supplemental data. In some implementations, the upcoming programs may be categorized pursuant to a selection by the user. For example, the user may only want to see upcoming programs that have been viewed by females, ages 25-34. In another example, the user may only want to see upcoming programs for a given channel. In another example, the user may only want to see upcoming programs related to message data provided by famous persons. In another example, the user may only want to see upcoming programs related to supplemental data provided by a blog, such as the Huffington Post, Entertainment Weekly, etc.

In some implementations the number 306 and name 308 of the channel of the program is displayed. In some implementations, similar programs or channels are displayed. For example, the user may be watching XYZ channel, but the user's community prefers LMN channel, thereby displaying LMN channel. In some implementations, the name of the program is linked to a user account. In some implementations, the user's account is used to notify the user of upcoming or available programs.

In some implementations, the actors 310 in the program are displayed. For example, in FIG. 3, the name and image of the actor 310 is shown in the display. In some implementations, additional programs featuring the actor are displayed. In some implementations, a link to the actor's website, social media accounts, biography, etc. are displayed. In some implementations, news feeds associated with the actor are displayed.

In some implementations, the viewership data 312 is displayed. For example, in FIG. 3, the viewership data 312 is displayed as both a percentage of viewers and a number of views in the same "TV circle" as the viewer. The percentage of viewers may be a total representation of the population of viewers. In some implementations, the percentage of viewers may be from a set of viewers that the user selects. For example, the user may only want to see a percentage of male viewers, ages 65+ that are viewing the program. In some implementations, the raw number of viewers from the user's community is displayed. For example, in FIG. 3, the number of viewers from a Google+ circle is displayed. In some implementations, the user selects to display a specific community to determine the programs that that community is viewing.

In some implementations, the message data 314 is displayed. For example, in FIG. 3, the message data is displayed as a message bubble with a measurement bar. In some implementations, the measurement bar is the volume of message data. In some implementations, the measurement bar is the rate of message data. In some implementations, the measurement bar is the total number of message data from a community. In some implementations, the measurement bar or the message bubble is a hyperlink to more information related to the message data. In some implementations, the link is associated with a preview of available information.

Figure 4:
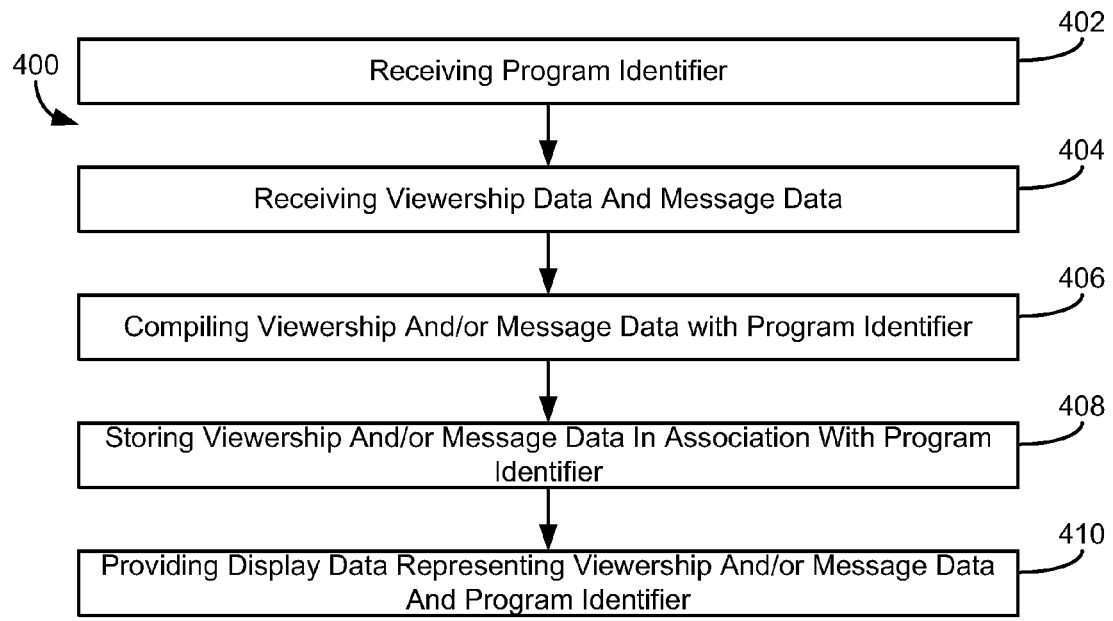
FIG. 4 is a flow diagram of a method in accordance with a described implementation.

Referring to FIG. 4, a flow diagram of a method in accordance with a described implementation is shown. In a brief overview, the method 400 involves providing viewership and/or message data to a display. Method 400 begins with block

402, in which a program identifier for a media program to be viewed is received. In some implementations, the search engine 120 determines the program identifier and provide the program identifier to a processor 116. In some implementations, a media engine (not shown) determines the program identifier and provide the program identifier to a processor 116. The media engine may be implemented as software or hardware. For example, the media engine may be a standalone, downloadable, open platform application. In some implementations, the media engine is hosted by a server. In some implementations, the media engine is hosted by a client. In some implementations, the media engine communicates with the search engine. In some implementations, the processor 116 receives the program identifier.

Block 402 is followed by block 404, in which viewership data relating to a plurality of viewers of the media program and message data relating to a quantity of electronic messages relating to the media program being generated by the plurality of viewers of the media program is received. In some implementations, the search engine 120 determines the viewership data and the message data and provide the data to the processor 116. In some implementations, a media engine (not shown) determines the viewership data and the message data and provide the data to the processor 116.

Block 404 is followed by block 406, in which the viewership and/or message data is compiled with the program identifier. In some implementations, the search engine 120 compiles the viewership and/or message data. In some implementations, a media engine (not shown) compiles the viewership and/or message data with the program identifier.

Block 406 is followed by block 408, in which the viewership and/or message data is stored in a memory in association with the program identifier. In some implementations, the viewership and/or message data is stored in a memory in a server. In some implementations, the viewership and/or message data is stored in a memory in a client.

Block 408 is followed by block 410, in which display data representing the viewership and/or message data and the program data is provided. In some implementations, the display data is provided in a visual format. In some implementations, the display data is provided to a user interface. The user interface may be a graphical user interface, a text-based interface, etc. In some implementations, the display data is provided in an audio format (e.g., for the visually impaired).

Figure 5:
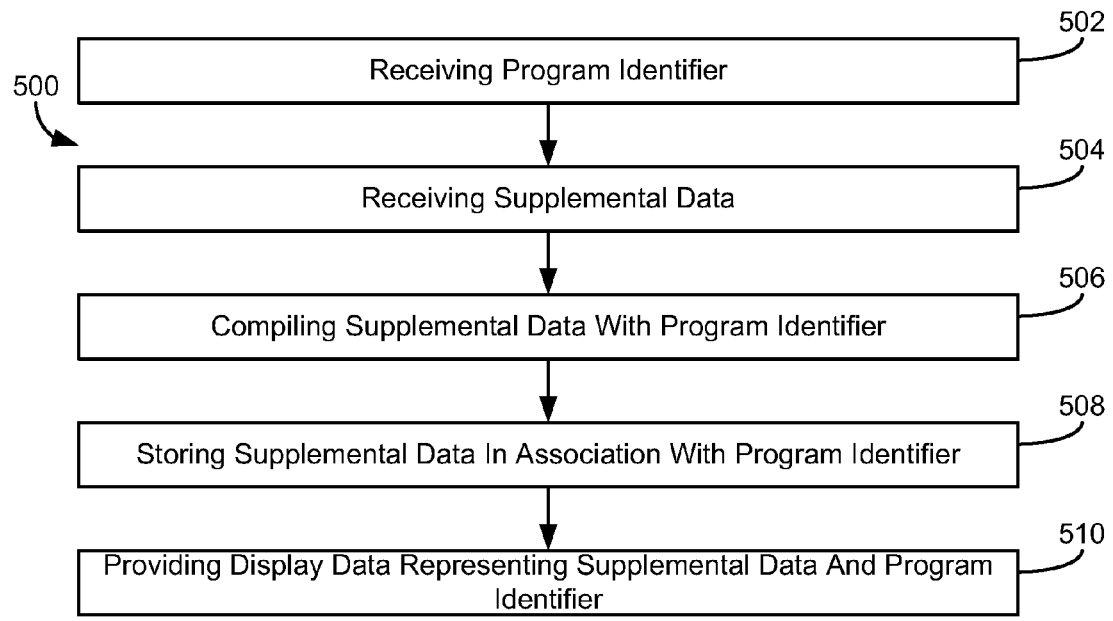
FIG. 5 is a flow diagram of a method in accordance with a described implementation.

Referring to FIG. 5, a flow diagram of a method in accordance with a described implementation is shown. In a brief overview, the method 500 involves providing supplemental data to a display. Method 500 begins with block 502, in which a program identifier for a media program to be viewed is received at a processing circuit. Block 502 is followed by block 504, in which supplemental data relating to a quantity of electronic information relating to the media program being generated by one or more users is received from a source other than a source of the media program by the processing circuit. Block 504 is followed by block 506, in which the supplemental data is compiled with the program identifier at the processing circuit. Block 506 is followed by block 508, in which the supplemental data is stored in a memory in association with the program identifier. Block 508 is followed by block 510, in which display data representing the supplemental data is provided.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "client" or "server" includes all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, at a server, a plurality of program identifiers each for a respective one of a plurality of media programs;
determining at a search engine in the server a plurality of viewers of a plurality of currently playing media programs in the plurality of media programs that are associated with a social network community of a user in a social network used by the user;
receiving, at the server, viewership data and message data relating to the plurality of viewers of the plurality of currently playing media programs, the viewership data indicating which of the plurality of currently playing media programs each of the plurality of viewers is watching and the message data indicating the volume of electronic messages generated by the plurality of viewers regarding each of the plurality of currently playing media programs;
compiling, at the server, the viewership data;
compiling, at the server, the message data;
storing, at the server, the viewership data and the message data in a memory device in association with the plurality of program identifiers; and
providing, over a communication network, display data representing the viewership data, the message data and the plurality of program identifiers from the server to a client device of the user, wherein the display data indicates the number of viewers in the plurality of viewers that are watching each of the plurality of currently playing media programs and indicates the volume of messages generated by the plurality of viewers that correspond to each of the plurality of currently playing media programs.

2. The method of claim 1, wherein the viewership data comprises one or more of a total number of viewers, a percentage of viewers of a community, a demographic of viewers, or a number of viewers at time intervals.

3. The method of claim 1, wherein the message data comprises a volume or a rate of real-time commentary related to each of the plurality of currently playing media programs.

4. The method of claim 1, further comprising:
receiving electronic program guide data comprising one or more of a name of each of the plurality of currently playing media programs, a name of a channel on which each of the plurality of currently playing media programs is currently playing, and actors in each of the plurality of currently playing media programs;
storing the electronic program guide data in a memory in association with the plurality of program identifiers; and
providing the electronic program guide data along with the display data and the plurality of program identifiers for display on a single screen.

5. The method of claim 1, further comprising:
collecting the viewership data and the message data over a period of time;
generating trending data of the viewership data and the message data over the period of time; and
providing the trending data along with the display data and the plurality of program identifiers.

6. The method of claim 1, further comprising:
receiving one or more websites, blog posts, or news articles relating to one or more of the plurality of currently playing media programs;
compiling the one or more websites, blog posts, or news articles with one or more of the plurality of program identifiers;
storing the one or more websites, blog posts, or news articles in a memory in association with the one or more of the plurality of program identifiers; and
providing display data representing the one or more websites, blog posts, or news articles and the one or more of the plurality of program identifiers to a client device of the user.

7. The method of claim 6, wherein the one or more websites, blog posts, or news articles comprises volume and rate of the one or more websites, blog posts, or news articles related to one or more of the plurality of currently playing media programs.

8. The method of claim 6, further comprising:
collecting the one or more websites, blog posts, or news articles over a period of time;
generating trending data of the one or more websites, blog posts, or news articles over the period of time; and
providing the trending data along with the display data and one or more of the plurality of program identifiers.

9. The method of claim 8, wherein collecting the one or more websites, blog posts, or news articles further comprises collecting usage information of the one or more websites, blog posts, or news articles, wherein the usage information comprises frequency of visits, number of visitors, and demographics of visitors.

10. A system comprising:
in a server, memory hardware storing program instructions, and one or more processors in data communication with the memory hardware and configured to execute the program instructions, and upon execution the program instructions cause the one or more processors to perform operations comprising:
receiving, at the server, a plurality of program identifiers each for a respective one of a plurality of media programs;
determining at a search engine in the server a plurality of viewers of a plurality of currently playing media programs in the plurality of media programs that are associated with a social network community of a user in a social network used by the user;
receiving, at the server, viewership data and message data relating to the plurality of viewers of the plurality of currently playing media programs, the viewership data indicating which of the plurality of currently playing media programs each of the plurality of viewers is watching and the message data indicating the volume of electronic messages generated by the plurality of viewers regarding each of the plurality of currently playing media programs;
compiling, at the server, the viewership data using the one or more processors;
compiling, at the server, the message data;
storing, at the server, the viewership data and the message data in a memory device in association with the plurality of program identifiers; and
providing, over a communication network, display data representing the viewership data, the message data and the plurality of program identifiers from the server to a client device of the user, wherein the display data indicates the number of viewers in the plurality of viewers that are watching each of the plurality of currently playing media programs and indicates the volume of messages generated by the plurality of viewers that correspond to each of the plurality of currently playing media programs.

11. The system of claim 10, wherein the viewership data comprises one or more of a total number of viewers, a percentage of viewers of a community, a demographic of viewers, or a number of viewers at time intervals.

12. The system of claim 10, wherein the message data comprises a volume or a rate of real-time commentary related to each of the plurality of currently playing media programs.

13. The system of claim 10, further comprising:
receiving electronic program guide data comprising one or more of a name of each of the plurality of currently playing media programs, a name of a channel on which each of the plurality of currently playing media programs is currently playing, or actors in each of the plurality of currently playing media programs;
storing the electronic program guide data in a memory in association with the plurality of program identifiers; and
providing the electronic program guide data along with the display data and the plurality of program identifiers for display on a single screen.

14. The system of claim 10, further comprising:
collecting the viewership data and the message data over a period of time;
generating trending data of the viewership data and the message data over the period of time; and
providing the trending data along with the display data and the plurality of program identifiers.

15. The system of claim 10, further comprising:
receiving one or more of websites, blog posts, or news articles relating to one or more of the plurality of currently playing media programs;
compiling the one or more websites, blog posts, or news articles with one or more of the plurality of program identifiers;

storing the one or more websites, blog posts, or news articles in a memory in association with the one or more of the plurality of program identifiers; and providing display data representing the one or more websites, blog posts, or news articles and the one or more of the plurality of program identifiers to a client device of the user.

16. The system of claim 15, wherein the one or more websites, blog posts, or news articles comprises volume and rate of one or more websites, blog posts, or news articles related to one or more of the plurality of currently playing media programs.

17. The system of claim 15, further comprising:
collecting the one or more websites, blog posts, or news articles over a period of time;
generating trending data of the one or more websites, blog posts, or news articles over the period of time; and
providing the trending data along with the display data and one or more of the plurality of program identifiers.

18. The system of claim 17, wherein collecting the one or more websites, blog posts, or news articles further comprises collecting usage information of the one or more websites, blog posts, or news articles, wherein the usage information comprises frequency of visits, number of visitors, and demographics of visitors.

* * * * *